United States Patent
Kim et al.

(10) Patent No.: US 11,747,556 B2
(45) Date of Patent: Sep. 5, 2023

(54) INTEGRATED CIRCUIT DEVICE INCLUDING PHOTOELECTRONIC ELEMENT

(71) Applicant: Samsung Electronics Co., Ltd., Suwon-si (KR)

(72) Inventors: Jung-hye Kim, Hwaseong-si (KR); Keun-yeong Cho, Suwon-si (KR); Ho-chul Ji, Seongnam-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 17/706,443

(22) Filed: Mar. 28, 2022

(65) Prior Publication Data

US 2022/0221646 A1    Jul. 14, 2022

Related U.S. Application Data

(62) Division of application No. 16/565,076, filed on Sep. 9, 2019, now Pat. No. 11,287,570.

(30) Foreign Application Priority Data

Oct. 10, 2018    (KR) .................. 10-2018-0120610

(51) Int. Cl.
 *G02B 6/12* (2006.01)
 *G02B 6/124* (2006.01)

(52) U.S. Cl.
 CPC ......... *G02B 6/12004* (2013.01); *G02B 6/124* (2013.01); *G02B 2006/12061* (2013.01); *G02B 2006/12107* (2013.01); *G02B 2006/12121* (2013.01); *G02B 2006/12123* (2013.01)

(58) Field of Classification Search
 None
 See application file for complete search history.

(56) References Cited

U.S. PATENT DOCUMENTS

| | | | |
|---|---|---|---|
| 7,075,165 B2 | 7/2006 | Leon et al. | |
| 7,553,687 B2* | 6/2009 | Reshotko | H01L 31/09 257/E31.049 |
| 8,290,325 B2* | 10/2012 | Reshotko | H01L 31/1085 385/129 |
| 8,866,187 B2* | 10/2014 | Na | H01L 31/1804 257/184 |
| 9,184,191 B2 | 11/2015 | Meade | |
| 9,368,669 B2 | 6/2016 | Meade et al. | |
| 9,711,662 B1* | 7/2017 | Gong | H01L 31/0224 |
| 9,864,138 B2* | 1/2018 | Coolbaugh | H01L 31/02327 |
| 10,121,927 B2* | 11/2018 | Nakayama | H01L 31/02005 |
| 2005/0104684 A1 | 5/2005 | Wojcik et al. | |
| 2006/0093967 A1 | 5/2006 | Block | |
| 2007/0104410 A1* | 5/2007 | Ahn | H01L 31/125 257/E31.012 |
| 2007/0104441 A1 | 5/2007 | Ahn et al. | |
| 2009/0324164 A1 | 12/2009 | Reshotko et al. | |

(Continued)

*Primary Examiner* — Omar R Rojas
(74) *Attorney, Agent, or Firm* — Muir Patent Law, PLLC

(57) ABSTRACT

An integrated circuit (IC) device includes an optical IC substrate, a local trench inside the optical IC substrate, and a photoelectronic element including a photoelectric conversion layer buried inside the local trench. The photoelectric conversion layer is buried inside the local trench in the optical IC substrate to form the photoelectronic element. Thus, the IC device may inhibit warpage of the optical IC substrate.

19 Claims, 15 Drawing Sheets

(56) References Cited

U.S. PATENT DOCUMENTS

| | | |
|---|---|---|
| 2012/0288971 A1 | 11/2012 | Bogaerts et al. |
| 2013/0092980 A1 | 4/2013 | Na et al. |
| 2016/0155884 A1 | 6/2016 | Hon et al. |
| 2016/0197111 A1 | 7/2016 | Coolbaugh et al. |
| 2018/0106964 A1 | 4/2018 | Luo et al. |

* cited by examiner

INTEGRATED CIRCUIT DEVICE INCLUDING PHOTOELECTRONIC ELEMENT

CROSS-REFERENCE TO RELATED APPLICATION

This application is a divisional of U.S. application Ser. No. 16/565,076 filed Sep. 9, 2019, which claims the benefit of Korean Patent Application No. 10-2018-0120610, filed on Oct. 10, 2018, in the Korean Intellectual Property Office, the disclosure of each of which is incorporated herein in its entirety by reference.

BACKGROUND

The inventive concept relates to an integrated circuit (IC) device, and more particularly, to an IC device including a photoelectronic element (or photoelectronic device), which is implemented on an optical IC substrate.

To meet the demand for small-sized, high-speed electronic devices, an IC device may include a photoelectronic element used to transmit an optical signal. The photoelectronic element may include a photoelectric conversion layer or a cladding layer formed to a predetermined thickness on an optical IC substrate. When the photoelectric conversion layer or the cladding layer is formed to the predetermined thickness on the optical IC substrate, the IC device may suffer from a warpage phenomenon where the optical IC substrate warps during or after a manufacturing process.

SUMMARY

The inventive concept provides an integrated circuit (IC) device including a photoelectric device that may reduce and be less sensitive to warpage of an optical IC substrate and device.

According to an aspect of the inventive concept, there is provided an IC device comprising an optical IC substrate, a local trench inside the optical IC substrate, and a photoelectronic element (or device) including a photoelectric conversion layer buried inside the local trench.

According to another aspect of the inventive concept, there is provided an IC device comprising an optical IC substrate, a local trench inside the optical IC substrate, a buried insulating layer buried in the local trench, and a photoelectronic element including a photoelectric conversion layer formed within the buried insulating layer, the photoelectric conversion layer being electrically insulated by the buried insulating layer.

According to another aspect of the inventive concept, there is provided an IC device comprising an optical IC substrate, a local trench formed in the optical IC substrate, a photoelectronic element including a photoelectric conversion layer buried in the local trench, and an optical waveguide layer optically coupled to the photoelectric conversion layer.

BRIEF DESCRIPTION OF THE DRAWINGS

Embodiments of the inventive concept will be more clearly understood from the following detailed description taken in conjunction with the accompanying drawings in which.

DETAILED DESCRIPTION OF THE EMBODIMENTS

Figure 1:
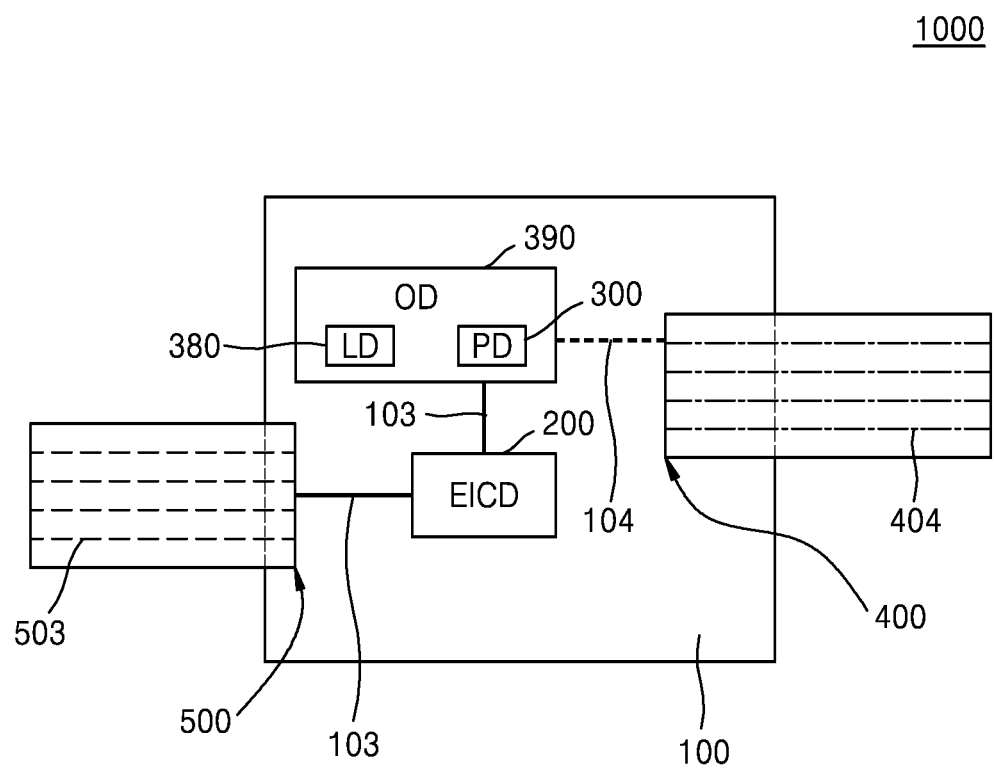
FIG. 1 is a plan view of an integrated circuit (IC) device according to an embodiment.

FIG. 1 is a plan view of an integrated circuit (IC) device 1000 according to an embodiment.

Specifically, the IC device 1000 may include an optical IC substrate 100, an optical device (OD) 390, and an optical interface 400.

The OD 390 may be formed on the optical IC substrate 100. The optical IC substrate 100 may be a silicon-on-insulator (SOI) substrate or a bulk silicon substrate. The OD 390 may include a photoelectronic element (also referred to as a photoelectronic device) 300. The photoelectronic element 300 may include a photoelectric conversion element (also referred to as a photoelectric conversion device). The photoelectronic element 300 may include a photodetector. The photoelectronic element 300 may be a photodiode (PD). The optical device 390 may include an electro-optic element 380 or an electro-optic conversion element. The electro-optic element 380 may be a laser diode (LD).

FIG. 1 illustrate a case in which both the photoelectronic element 300 and the electro-optic element 380 are integrated on optical IC substrate 100. However, the electro-optic element 380 may not be integrated on the optical IC substrate 100 but may be formed on a separate substrate and be formed with a separate module or system.

The optical interface 400 may be formed on one side of the optical IC substrate 100 (e.g., formed on an active surface of the optical IC substrate 100). The optical interface 400 may be optically coupled to the optical IC substrate 100. The optical interface 400 may be optically coupled to an optical waveguide layer 104 formed on the optical IC substrate 100. The optical waveguide layer 104 may be a layer in which one or more waveguides WG are formed to provide one or more paths through which light (or an optical signal) is transmitted. Although the OD 390 and the optical waveguide layer 104 are illustrated as being separate in FIG.

1, the optical waveguide layer 104 also may be formed in the OD 390. The optical interface 400 may be an optical connector configured to physically and optically connect to one or more optical fibers 404. Although the optical interface 400 is illustrated on the optical IC substrate 100 in FIG. 1, the optical interface 400 may be located in contact with or apart from the optical IC substrate 100.

The IC device 1000 may further include an electronic IC device (EICD) 200, which may be formed on the optical IC substrate 100. The EICD 200 may be located on the optical IC substrate 100 at a location spaced apart from the OD 390.

The optical IC may also include an electrical interface 500 which, in some examples, may be installed on another side of the optical IC substrate 100. The electrical interface 500 may be coupled to the EICD 200 through wiring (e.g., conductive metal lines formed as part of the IC device 1000. FIG. 1 illustrates an interface interconnection lines 503 (e.g., a wiring) connecting to and terminating at the electrical interface 500. At least one of the interface interconnection lines 503 may be connected to the EICD 200 by a first circuit interconnection line 103. The electrical interface 500 may comprise conventional semiconductor device terminals, such as chip pads, TSVs (through substrate vias), conductive bumps (e.g., solder balls or solder pillars, etc.) forming a ball grid array (BGA), etc. The OD 390 may be electrically coupled to the EICD 200 through a second circuit interconnection line 103 (e.g., wiring such as a conductive metal line). The electrical interface 500 may be located above the optical IC substrate 100 and part of the active surface of the IC device 1000, or may be located on the backside of the IC device 1000 (opposite to that of the active surface) and may be in contact with the optical IC substrate 100. It should be appreciated that the interface interconnection lines 503 and optical fibers 404 may connect to the IC device 1000, while other elements shown in FIG. 1 may be integrally formed as part of the IC device 1000. When the IC device 1000 is embodied as a semiconductor chip (e.g., formed together with other IC devices 1000 on a wafer and cut (singulated) from the wafer), circuit interconnection lines 103, EICD 200, optical device 390 and optical waveguides—including optical waveguide layer (WG) 104—may be integrally formed as elements of the semiconductor chip and integrally formed with other electrical/optical circuit elements of the semiconductor chip. All or portions of the optical interface 400 and the electrical interface 500 may also be formed as part of such a semiconductor chip. For example, the optical interface 400 and the electrical interface 500, respectively may be electrical terminals (such as chip pads) and optical terminals (such as ends of waveguides, e.g., ends of patterned elements of optical waveguide layer (WG) 104), configured to be respectively connected to external signal transmission lines, such as interconnection lines 503 and optical fibers 404. Hereinafter, a signal transmission relationship among the OD 390, the optical interface 400, the EICD 200, and the electrical interface 500 will be described. It should be appreciated that while this description refers to a signal path for one signal, this is for purposes of explanation only and a plurality of signal paths (and thus a plurality of electrical and optical transmission elements and conversion elements) may be formed by IC device 1000 to operate simultaneously (e.g., in parallel) to transmit plural signals (i.e., OD 390, EICD 200, circuit interconnection lines 103 and waveguides of FIG. 1 may be replicated within IC device 1000 to provide a plurality of signal paths between the optical interface 400 and the electrical interface 500).

An electric signal transmitted through the interface interconnection line 503 connected to the electrical interface 500 may be received by the EICD 200 and the OD 390 through the circuit interconnection lines 103. When the OD 390 is the electro-optic element 380 (e.g., an LD device), an optical signal may be generated by the OD 390 in response to the received electrical signal and be transmitted to an external device connected to optical fiber 404 (from OD 390 through the optical waveguide layer 104—acting as a core layer of an optical waveguide—and the optical fiber 404 connected to the optical interface 400). Portions of the optical waveguide layer 104 extending between the OD 390 and the optical interface 400 may form a core of one or more optical waveguides with cladding of the optical waveguide(s) surrounding the core(s) of the optical waveguide(s). The optical waveguide(s) the within the IC device 1000 may be formed in various configurations and provide an optical signal path between the optical interface 400 and one or both of LD 380 and PD 300.

An optical signal received by optical fiber 404 through the optical interface 400 may be transmitted through the optical waveguide layer 104 to the OD 390 (e.g., the photoelectronic element 300). The optical signal may be converted into an electric signal by the photoelectronic element 300, and the electric signal may be transmitted to an external device connected to interface interconnection line 503 from the EICD 200 and via the electrical interface 500 and the interconnection line 503.

Figure 2:
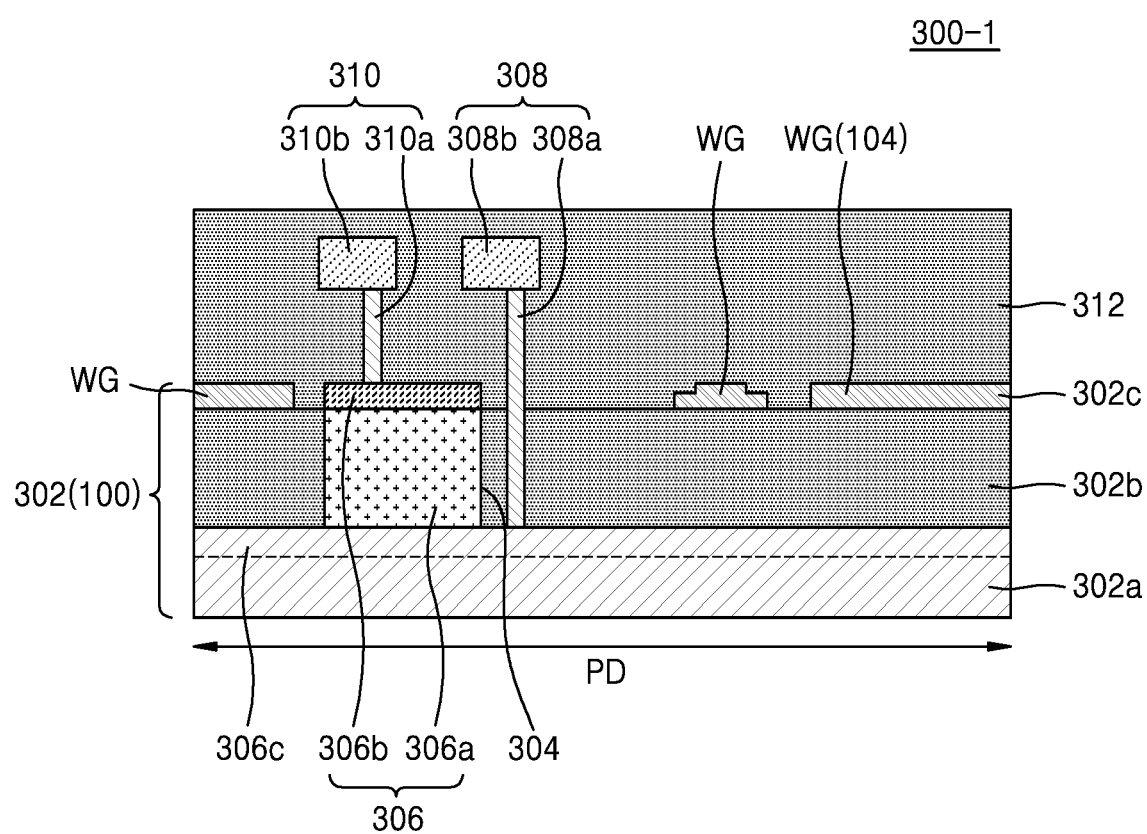
FIG. 2 is a cross-sectional view of a photoelectronic element according to an embodiment.

FIG. 2 is a cross-sectional view of a photoelectronic element 300-1 according to an embodiment.

The photoelectronic element 300-1 is one example of the photoelectronic element 300 of the IC device 1000 of FIG. 1. The photoelectronic element 300-1 may include a PD.

The photoelectronic element 300-1 may be formed with an optical IC substrate 302. The optical IC substrate 302 may be the optical IC substrate 100 of FIG. 1. The optical IC substrate 302 may be a silicon-on-insulator (SOI) substrate including a base silicon layer 302a, a buried insulating layer 302b formed on the base silicon layer 302a, and a silicon layer 302c formed on the buried insulating layer 302b. The silicon layer 302c may be the uppermost silicon layer of the SOI substrate 302.

Each of the base silicon layer 302a and the silicon layer 302c may be a crystalline silicon layer. Region 306c formed within an upper surface of base silicon layer 302a is doped with first-conductivity-type impurities, for example, N-type impurities. The buried insulating layer 302b may be a silicon oxide layer.

The silicon layer 302c may be patterned and serve as an optical waveguide layer WG. Specifically, the silicon layer 302c may be optical waveguide layer 104 and have patterned elements that form one or more core layers of one or more optical waveguides. The buried insulating layer 302b formed under the silicon layer 302c may serve as a lower cladding layer for such optical waveguide(s). The optical waveguide layer WG (302c) may be the same optical waveguide layer 104 of FIG. 1 and form cores of one or more waveguides. As shown in FIG. 2, the optical waveguide layer 104 WG may be patterned into portions that are apart from each other in a sectional view thereof (and may be patterned to form discrete pattern elements that are isolated from one another to form discrete optical waveguides). Although silicon layer 302c is shown to serve as an optical waveguide layer WG in FIG. 2, other implementations are possible that do not use silicon layer 302c to form optical waveguides.

A local trench 304 may be formed within the optical IC substrate 302. The local trench 304 may extend through are part way into the buried insulating layer 302b included in the optical IC substrate 302. The local trench 304 may have sidewalls formed by the buried insulating layer 302b and may have a bottom formed by base silicon layer 302a (when the trench extends through the buried insulating layer 302b—as illustrated in FIG. 2) or formed by a lower portion of buried insulating layer 302b (in accordance with other examples described herein).

A photoelectric conversion layer 306 may be buried inside the local trench 304. The photoelectric conversion layer 306 may include a plurality of semiconductor layers, for example, a first semiconductor layer 306a and a second semiconductor layer 306b. Portions of region 306c of base silicon layer 302a may also form photoelectric conversion layer 306. The photoelectric conversion layer 306 may be formed of one or more a silicon (Si) layers or germanium (Ge) layers, or other semiconductor materials to form PIN photodiodes or PN photodiodes. The photoelectric conversion layer 306 may include one or more crystalline silicon layers and/or a crystalline germanium layers. The first semiconductor layer 306a may be a crystalline germanium layer that is epitaxially grown using the base silicon layer 302a as a seed layer. A photodiode semiconductor structure is thus formed by the photoelectric conversion layer 306, comprising a stack of functional layers extending from a cathode formed by N-type region 306c to an anode formed by P-type second semiconductor layer 306b. A depletion region may be formed between the cathode and anode, and when exposed to light, a photon may generate an electron-hole pair to cause a photocurrent and voltage across the anode and cathode (in this example, 306c and 306b, respectively). The photodiode semiconductor structure may take many forms, including conventional PN photodiodes, PIN photodiodes, metal-semiconductor-metal photodiodes, etc. Each layer of the stack of semiconductor functional layers of the photodiode semiconductor structure may be a crystalline semiconductor layer. It will be appreciated that the stack of doped semiconductor functional layers of the photodiode semiconductor structure may include additional semiconductor layers in its stack of functional layers and/or be formed with other types of semiconductor materials other than the exemplary materials described herein. It should also be understood that photodiode semiconductor structure (the photoelectric conversion layer 306) may be formed so that anode (outermost N-type functional layer) is formed as the uppermost layer of the photodiode semiconductor structure and the cathode (outermost P-type functional layer) is formed as the lower most layer of the photodiode semiconductor structure.

In some embodiments, the first semiconductor layer 306a may be an undoped intrinsic crystalline germanium layer, and the second semiconductor layer 306b may be a crystalline silicon layer doped with impurities (e.g., P-type impurities) of a second conductivity type, which is opposite to the first conductivity type (which are doped in region 306c of base silicon layer 302a).

In an embodiment, the second semiconductor layer 306b including the P-type silicon layer, the first semiconductor layer 306a including the undoped intrinsic germanium layer, and the base silicon layer 302a including the N-type silicon region 306c may constitute a PIN PD.

The PIN PD may be a main component of the photoelectronic element 300-1. In a narrow sense, the PIN PD may be referred to as the photoelectronic element 300-1. The photoelectronic element 300-1 may be optically coupled to the optical waveguide layer WG.

Although the PIN PD is illustrated as the main component of the photoelectronic element 300-1 in FIG. 1, the photoelectronic element 300-1 may adopt a PN PD or a metal-semiconductor-metal PD. Since the photoelectric conversion layer 306 (specifically, the first semiconductor layer 306a) is buried inside the local trench 304, the photoelectronic element 300-1 may be less sensitive to a warpage phenomenon when the optical IC substrate 302 warps as well as contribute less to warpage of the IC device 1000.

An interlayer insulating layer 312 may be formed on the optical IC substrate 302 on which the photoelectric conversion layer 306 and the optical waveguide layer WG are formed. The interlayer insulating layer 312 may be/include a silicon oxide layer. The interlayer insulating layer 312 may serve as an upper cladding layer of optical waveguide(s) formed using silicon layer 302c as a core layer of the optical waveguide(s). The base silicon layer 302a (specifically, the N-type silicon region 306c) may be electrically connected to a first conductive line 308 outside the local trench 304. The first conductive line 308 may include a first contact plug (e.g., via) 308a, which may be formed inside a contact hole formed in the interlayer insulating layer 312 and a contact hole formed in the buried insulating layer 302b, and a first interconnection layer 308b (e.g., wiring extending horizontally within IC device 1000), which may be electrically connected to the first contact plug 308a and formed in the interlayer insulating layer 312.

The second semiconductor layer 306b (e.g., the P-type silicon layer) included in the photoelectric conversion layer 306 may be electrically connected to a second conductive line 310. The second conductive line 310 may include a second contact plug 310a, which may be formed in a contact hole extending through the interlayer insulating layer 312, and a second interconnection layer 310b (e.g., wiring extending horizontally within IC device 1000), which may be electrically connected to the second contact plug 310a and formed in the interlayer insulating layer 312. First and second interconnection layers 308b and 310b may be wiring formed from a patterned metal layer.

In the photoelectronic element 300-1, the first conductive line 308 and the second conductive line 310 may be respectively electrically connected to the N-type silicon region 306c and the P-type silicon layer (i.e., the second semiconductor layer 306b), which may be respectively located under and on the first semiconductor layer 306a including the intrinsic germanium layer, thereby constituting the PIN PD.

The first conductive line 308 and the second conductive line 310 may be respectively electrically connected to a lower portion of the PIN PD (i.e., the anode formed by N-type region 306c of the base silicon layer 302a) and an upper portion of the PIN PD (i.e., the cathode formed by the P-type second semiconductor layer 306b, which is stacked on the N-type silicon region 306c in a vertical direction). Thus, the photoelectronic element 300-1 may be a vertical photoelectronic element.

In the photoelectronic element 300-1, an optical signal transmitted by the optical waveguide layer WG or 104 may be converted into an electric signal by the PIN PD including the photoelectric conversion layer 306 and transmitted to the EICD (refer to 200 in FIG. 1) through the first interconnection layer 308b of the first conductive line 308 or the second interconnection layer 310b of the second conductive line 310. The photoelectronic element 300-1 need not transmit the optical signal to the PIN PD by a waveguide using silicon layer 302c and may transmit the optical signal by other means. For example, the optical signal may be applied from an external source to the PIN PD including the photoelectric conversion layer 306 and converted into an electric signal, such as through an opening or waveguide formed above the PIN PD.

Figure 3A:
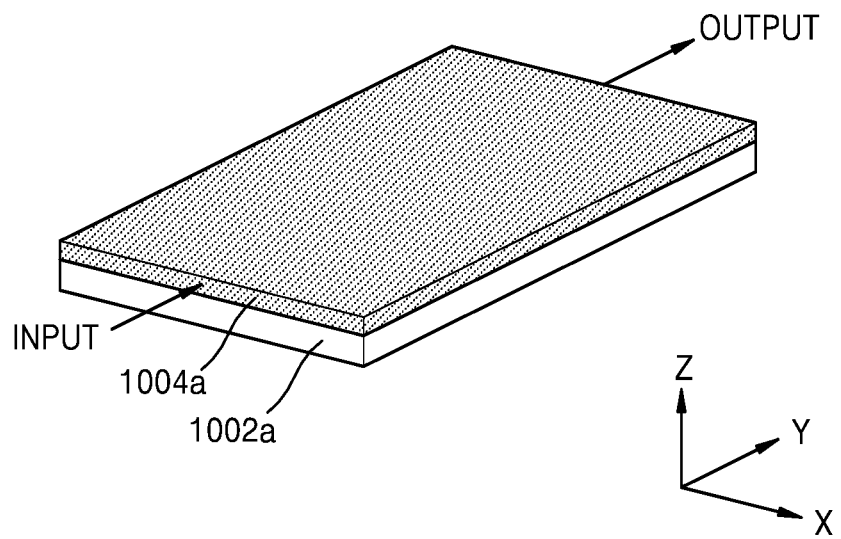
FIGS. 3A to 3C are perspective views of optical waveguide layers of FIGS. 1 and 2, according to various embodiments.
Figure 3B:
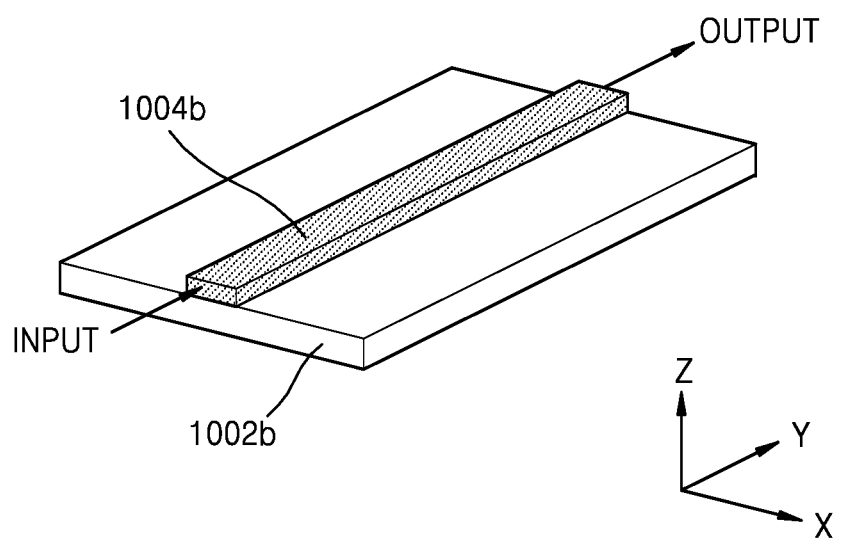
Figure 3C:
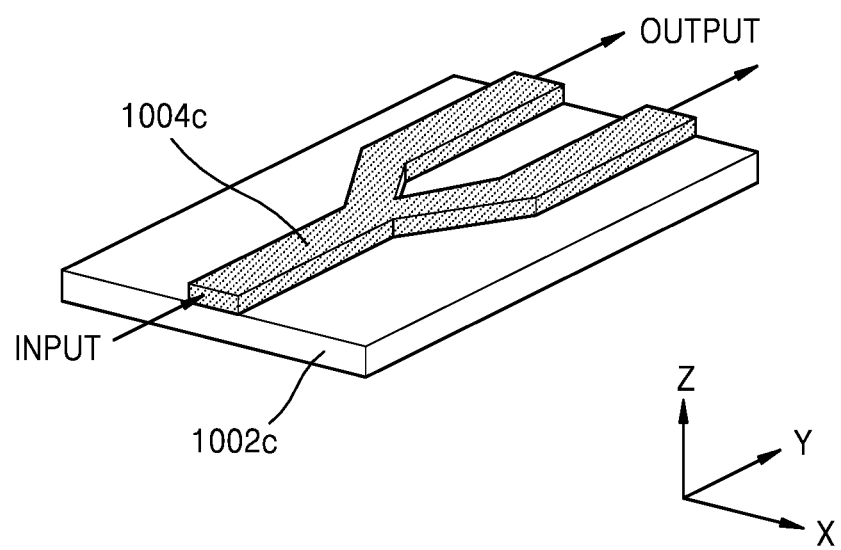

FIGS. 3A to 3C are perspective views of optical waveguide layers of FIGS. 1 and 2, according to various embodiments.

Specifically, the optical waveguide layers 104 (WG) of FIGS. 1 and 2 may be patterned to have portions form optical waveguide cores 1004a, 1004b, and/or 1004c of FIGS. 3A to 3C. In FIGS. 3A to 3C, Z denotes a vertical direction, X denotes a widthwise direction of the optical waveguide cores, and Y denotes a lengthwise direction (along the length of the optical waveguide cores corresponding to an optical signal transmission path).

Referring to FIG. 3A, the optical waveguide core 1004a may be formed as a core layer located as a one-dimensional (1D) planar slab type on a lower cladding layer 1002a. An air layer may be used as an upper cladding layer. Alternatively, an interlayer insulating layer or other insulating layer may be used as the upper cladding layer as shown in FIG. 2. Operatively, a change in refractive index may occur only in the depthwise direction (Z), an optical signal passing through the optical waveguide core 1004a may be reflected only with respect to the depthwise direction (Z). In FIG. 3A, an optical signal input to one side of the optical waveguide core 1004a may be output from another side thereof. Multiple discretely separated signals may be simultaneously transmitted through the slab type core layer 1004a between plural optical devices 390 (either LD 380 or PD 300) and corresponding optical fibers 404.

Referring to FIG. 3B, the optical waveguide core 1004b may be formed as a channel type core on a lower cladding layer 1002b. An air layer may be used as an upper cladding layer. Alternatively, an interlayer insulating layer may be used as the upper cladding layer as shown in FIG. 2. In this case, a change in refractive index may occur both in the depthwise direction (Z) and the widthwise direction (X) of the optical waveguide core 1004b of a channel type. In FIG. 3B, an optical signal input to one side of the optical waveguide core 1004b may be output from another side thereof.

Referring to FIG. 3C, the optical waveguide layer 104 may include a core 1004c formed as a branched channel type on a lower cladding layer 1002c. An air layer may be used as an upper cladding layer. Alternatively, an interlayer insulating layer may be used as the upper cladding layer as shown in FIG. 2. In FIG. 3C, an optical signal input to one side of the core 1004c of the optical waveguide layer 104 may be output from another side thereof. The core 1004c of optical waveguide layer 104 may split the input optical signal into two output signals.

Figure 4:
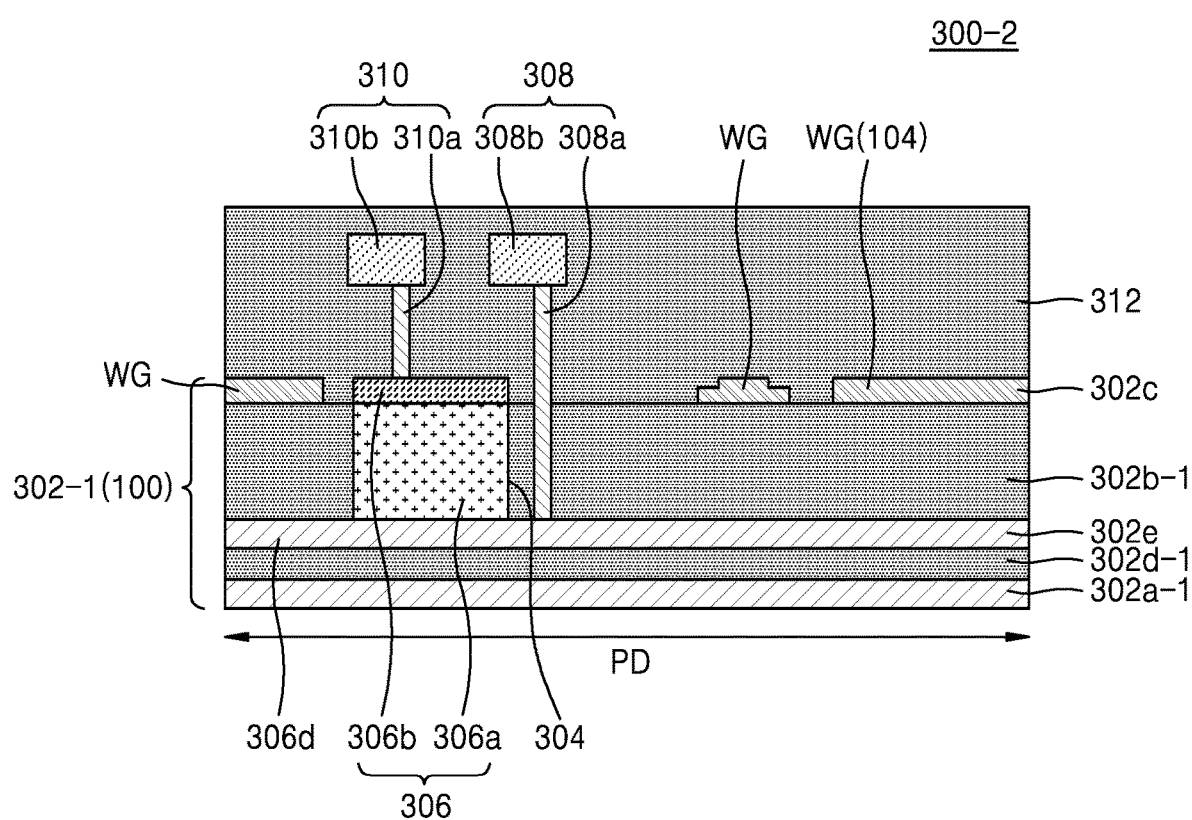
FIG. 4 is a cross-sectional view of a photoelectronic element according to an embodiment.

FIG. 4 is a cross-sectional view of a photoelectronic element 300-2 according to an embodiment.

Specifically, the photoelectronic element 300-2 may be the same as the photoelectronic element 300-1 of FIG. 2 except that the optical IC substrate 302-1 is a double SOI substrate. The photoelectronic element 300-2 may include a PD. In FIG. 4, the same reference numerals are used to denote the same elements as in FIGS. 1 and 2 and repetitive descriptions will be omitted or briefly provided.

The optical IC substrate 302-1 may be a double SOI substrate including a first base silicon layer 302a-1, a first buried insulating layer 302d-1 formed on the first base silicon layer 302a-1, a buried silicon layer 302e formed on the first buried insulating layer 302d-1, a second buried insulating layer 302b-1 formed on the buried silicon layer 302e, and a silicon layer 302c formed on the second buried insulating layer 302b-1. The optical IC substrate 302-1 may be an SOI substrate obtained by sequentially and repeatedly forming silicon layers and insulating layers.

The first buried insulating layer 302d-1 and the second buried insulating layer 302b-1 may be silicon oxide layers. The buried silicon layer 302e may be a crystalline silicon layer. The buried silicon layer 302e may be a silicon layer 306d doped with first-conductivity-type impurities, for example, N-type impurities, and thus be an N-type silicon layer. A local trench 304 may be formed in the second buried insulating layer 302b-1. The local trench 304 may have sides formed by the second buried insulating layer 302b-1 and a bottom formed by the buried silicon layer 302e.

A photoelectric conversion layer 306 may be buried inside the local trench 304. The photoelectric conversion layer 306 may include a first semiconductor layer 306a and a second semiconductor layer 306b and a portion of the silicon layer 302e under first semiconductor layer 306a. The first semiconductor layer 306a may be a crystalline germanium layer that is epitaxially grown using the buried silicon layer 302e as a seed layer.

As described above, the photoelectronic element 300-2 may be easily formed by epitaxially growing the first semiconductor layer 306a within trench 304 using the buried silicon layer 302e as a seed layer. The photoelectronic element 300-2 may have the buried silicon layer 302e separated from the first base silicon layer 302a-1 by the first buried insulating layer 302d-1, and further inhibit warpage of the optical IC substrate 302-1.

Figure 5:
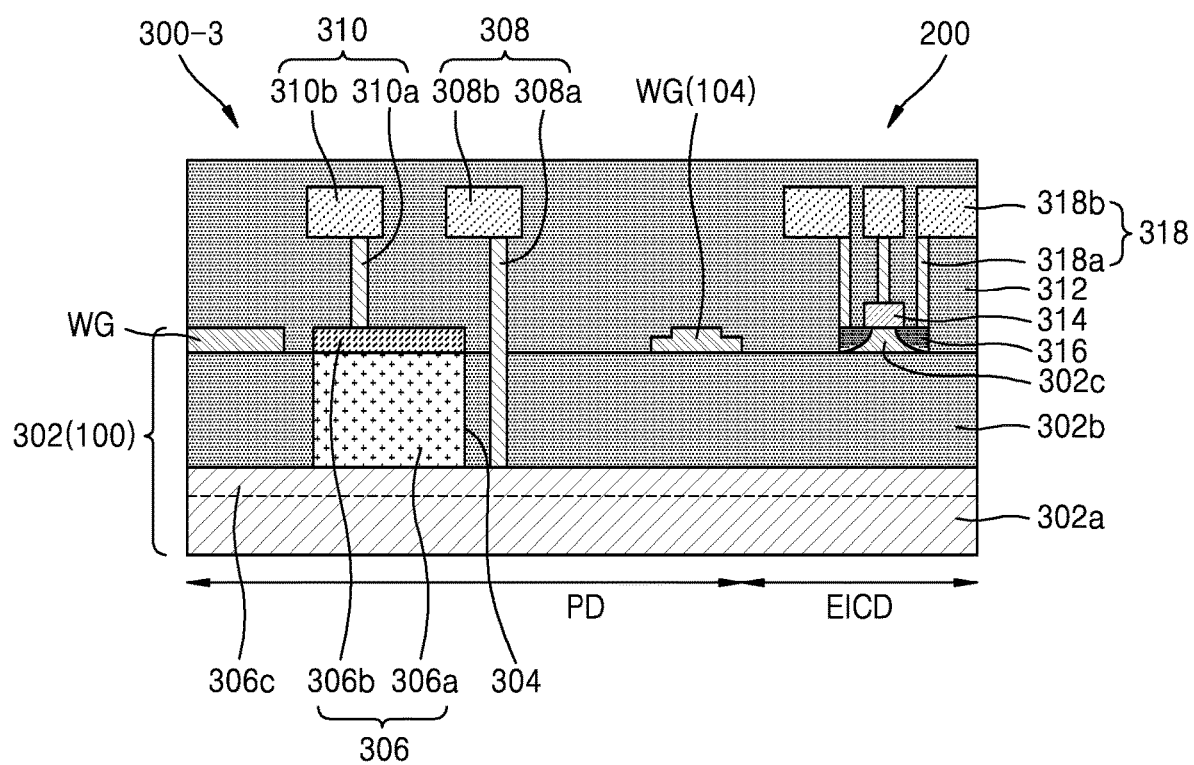
FIG. 5 is a cross-sectional view of a photoelectronic element according to an embodiment.

FIG. 5 is a cross-sectional view of a photoelectronic element 300-3 combined with an EICD according to an embodiment.

The photoelectronic element 300-3 may be the same as the photoelectronic element 300-1 of FIG. 2. The photoelectronic element 300-3 may be a PD and combined with an EICD. In FIG. 5, the same reference numerals are used to denote the same elements as in FIGS. 1 and 2. In FIG. 5, the same descriptions as in FIGS. 1 and 2 will be omitted or briefly provided.

The EICD may be integrated on and include elements formed in the optical IC substrate 302. The EICD may be the EICD 200 of FIG. 1. The EICD may be an integrated circuit of the IC device 1000 including a plurality of interconnected transistors, such as a MOS transistor including a gate electrode 314 and source and drain regions 316 shown in FIG. 5. The EICD 200 and the photoelectronic element 300-3 may be integrated within a semiconductor chip.

The source and drain regions 316 may be formed from portions of silicon layer 302c formed on a buried insulating layer 302b. Third conductive lines 318 may be formed on the gate electrode 314 and the source and drain regions 316. Each third conductive line 318 may include a third contact plug 318a, which is formed inside a contact hole of an interlayer insulating layer 312, and a third interconnection layer 318b, which is electrically connected to the third contact plug 318a and formed in the interlayer insulating layer 312. First, second and third interconnection layers 308b, 310b and 318b may be formed from portions of the same conductive layer.

Since the EICD is further integrated in the optical IC substrate 302 as described above, the photoelectronic element 300-3 may easily control an electric signal.

Figure 6:
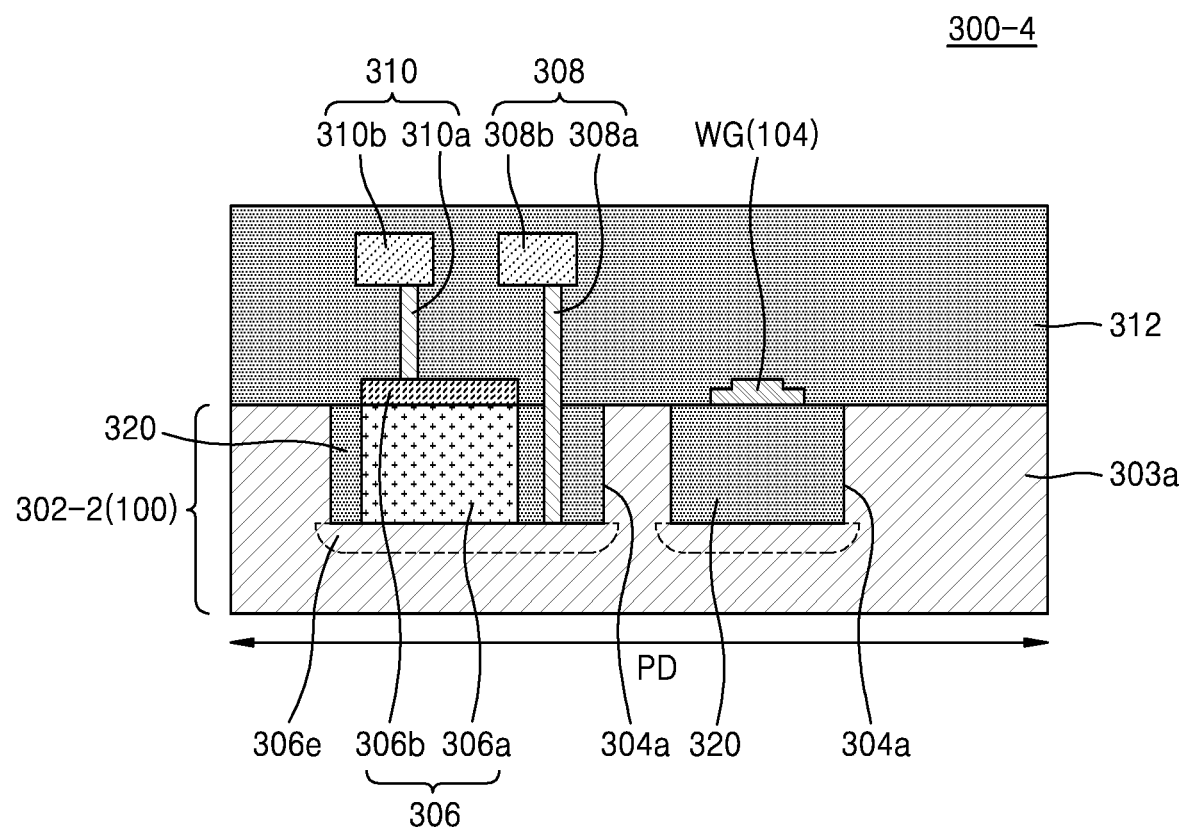
FIG. 6 is a cross-sectional view of a photoelectronic element according to an embodiment.

FIG. 6 is a cross-sectional view of a photoelectronic element 300-4 according to an embodiment.

The photoelectronic element 300-4 may be the same as the photoelectronic element 300-1 of FIG. 2 except that an optical IC substrate 302-2 is formed as a bulk silicon substrate. The photoelectronic element 300-2 may be a PD. In FIG. 6, the same reference numerals are used to denote the same elements as in FIGS. 1 and 2 and the same descriptions will be omitted or briefly provided.

The photoelectronic element 300-4 may be formed on and/or within the optical IC substrate 302-2. The optical IC substrate 302-2 may be the optical IC substrate 100 of FIG. 1. The optical IC substrate 302-2 may be a bulk silicon substrate such as a bulk crystalline silicon substrate (e.g., sliced from a crystalline silicon ingot).

A local trench 304a may be formed in an upper portion of the bulk silicon substrate 302-2. The local trench 304a may be formed by etching the upper portion of the bulk silicon substrate 302-2 (i.e., upper portion of the bulk silicon layer 303a).

A plurality of local trenches 304a may be formed and separated from each other. Each trench may have sides and a bottom formed by the bulk silicon substrate 302-2. A buried insulating layer 320 may be formed in the local trenches 304a of the bulk silicon substrate 302-2.

In an embodiment, an N-type silicon region 306e doped with first-conductivity-type impurities (e.g., N-type impurities) may be formed in one surface of the bulk silicon layer 303a under the local trench 304a. A photoelectric conversion layer 306 may be formed inside the local trench 304a. The photoelectric conversion layer 306 may be surround by the buried insulating layer 320 formed inside the local trench 304a. The buried insulating layer 320 may be a silicon oxide layer.

The photoelectric conversion layer 306 may include a plurality of semiconductor layers as described elsewhere herein, such as, for example, first semiconductor layer 306a and second semiconductor layer 306b. The photoelectric conversion layer 306 may include a silicon layer or a germanium layer as well as portions of silicon region 306e below first semiconductor layer 306a. The photoelectric conversion layer 306 may include a crystalline silicon layer or a crystalline germanium layer. The first semiconductor layer 306a may include a germanium layer that is epitaxially grown using the bulk silicon layer 303a as a seed layer.

In an embodiment, the first semiconductor layer 306a may be/include an undoped intrinsic germanium layer, and the second semiconductor layer 306b may be/include a P-type silicon layer doped with impurities (e.g., P-type impurities) of a second conductivity type opposite to the first conductivity type. In an embodiment, the second semiconductor layer 306b including the P-type silicon layer, the first semiconductor layer 306a including the undoped intrinsic germanium layer, and the bulk silicon layer 303a including the N-type silicon layer 306e may constitute a PIN PD.

An optical waveguide layer WG may be formed on portions of the insulating layer 320. The optical waveguide layer WG may correspond to the optical waveguide layer 104 of FIG. 1. The optical waveguide layer WG may be a crystalline silicon layer, which may be formed by forming an amorphous polysilicon layer on the buried insulating layer 320 and crystallizing the amorphous polysilicon layer. Although optical waveguide layer WG is illustrated in FIG. 6, the optical waveguide layer WG may be omitted.

The bulk silicon layer 303a (i.e., the N-type silicon layer 306e) may be electrically connected to a first conductive line 308 inside the local trench 304a. The first conductive line 308 may include a first contact plug 308a, which may be formed inside contact holes of an interlayer insulating layer 312 and the buried insulating layer 320, and a first interconnection layer 308b, which may be electrically connected to the first contact plug 308a and formed in the interlayer insulating layer 312.

The second semiconductor layer 306b (e.g., a P-type silicon layer) included in the photoelectric conversion layer 306 may be electrically connected to a second conductive line 310. The second conductive line 310 may include a second contact plug 310a, which may be formed inside a contact hole of the interlayer insulating layer 312, and a second interconnection layer 310b, which may be electrically connected to the second contact plug 310a and formed in the interlayer insulating layer 312.

In the photoelectronic element 300-4, the first conductive line 308 and the second conductive line 310 may be respectively electrically connected to the N-type silicon layer 306e and the P-type silicon layer (i.e., the second semiconductor layer 306b) and may be respectively located under and on the first semiconductor layer 306a (e.g., the undoped intrinsic germanium layer), thereby constituting the PIN PD. Thus, the photoelectronic element 300-4 may be a vertical photoelectronic element.

Figure 7:
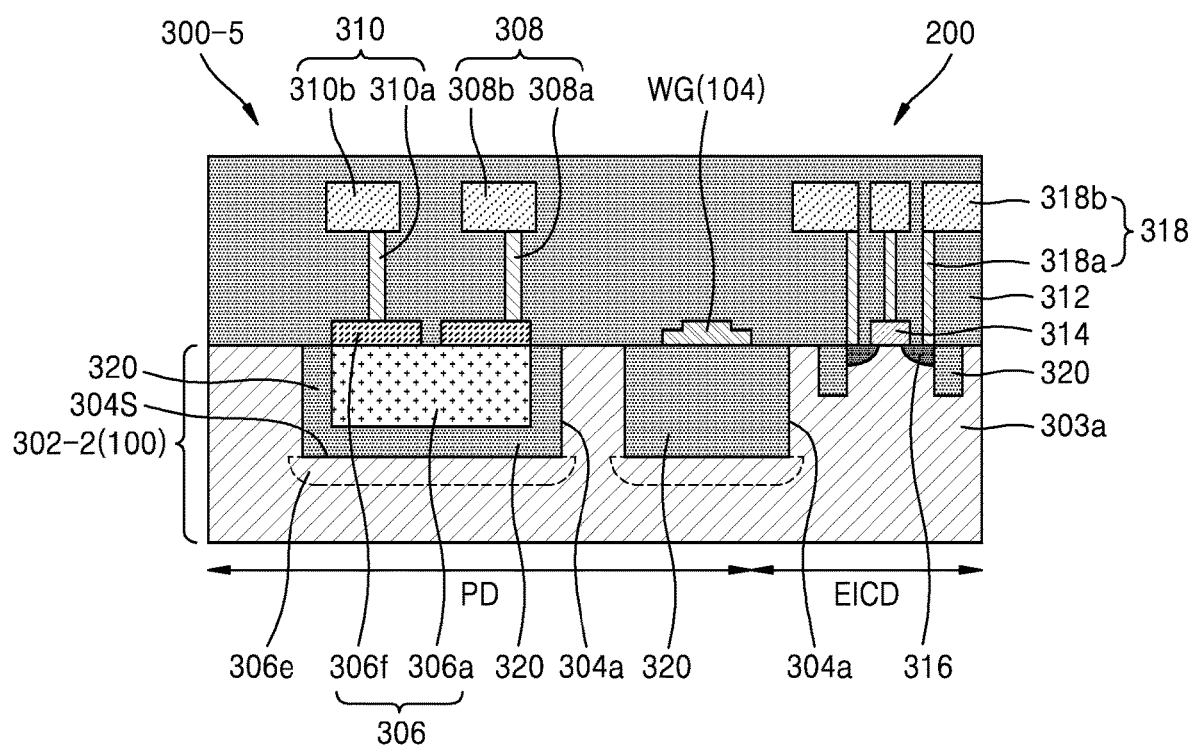
FIG. 7 is a cross-sectional view of a photoelectronic element according to an embodiment.

FIG. 7 is a cross-sectional view of a photoelectronic element 300-7 according to an embodiment.

Specifically, the photoelectronic element 300-5 may be the same as the photoelectronic element 300-4 of FIG. 6 except that the photoelectric conversion layer 306 is formed within a buried insulating layer 320 formed within a local trench 304a and electrically insulated from the bulk substrate 302-2, and except that the photoelectronic element 300-5 may be formed as a metal-semiconductor-metal PD. The photoelectronic element 300-5 may be a PD and may be combined with an EICD. In FIG. 7, the same reference numerals are used to denote the same elements as in FIG. 6 and the same descriptions will be omitted or briefly provided.

The photoelectric conversion layer 306 may be formed apart from a bottom 304S of the local trench 304a formed by bulk substrate 302-2. The buried insulating layer 320 may be formed inside the local trench 304a on sidewalls and the bottom of the local trench 304a. The photoelectric conversion layer 306 may be formed in the buried insulating layer 320 buried inside the local trench 304a and electrically insulated from the buried insulating layer 320. The photoelectric conversion layer 306 may be spaced apart from the bottom 304S of the local trench 304a (i.e., a surface of the bulk silicon layer 303a) and inside the local trench 304a. The photoelectric conversion layer 306 includes a metal layer 306f and first semiconductor layer 306a.

The photoelectronic element 300-5 may further include a first conductive line 308 electrically connected to a first portion of the metal layer 306f, and a second conductive line 310 electrically connected to a second portion of the metal layer 306f.

Thus, the photoelectronic element 300-5 may be a lateral photoelectronic element because the first conductive line 308 and the second conductive line 310 are formed apart from each other on the surface of the metal layer 306f. The lateral photoelectronic element may be a metal-semiconductor-metal photodiode. An optical waveguide layer WG may be formed on the buried insulating layer 320. An optical signal applied to the optical waveguide layer WG may be converted into an electric signal by the lateral photoelectronic element 300-7 including the photoelectric conversion layer 306.

Figure 8:
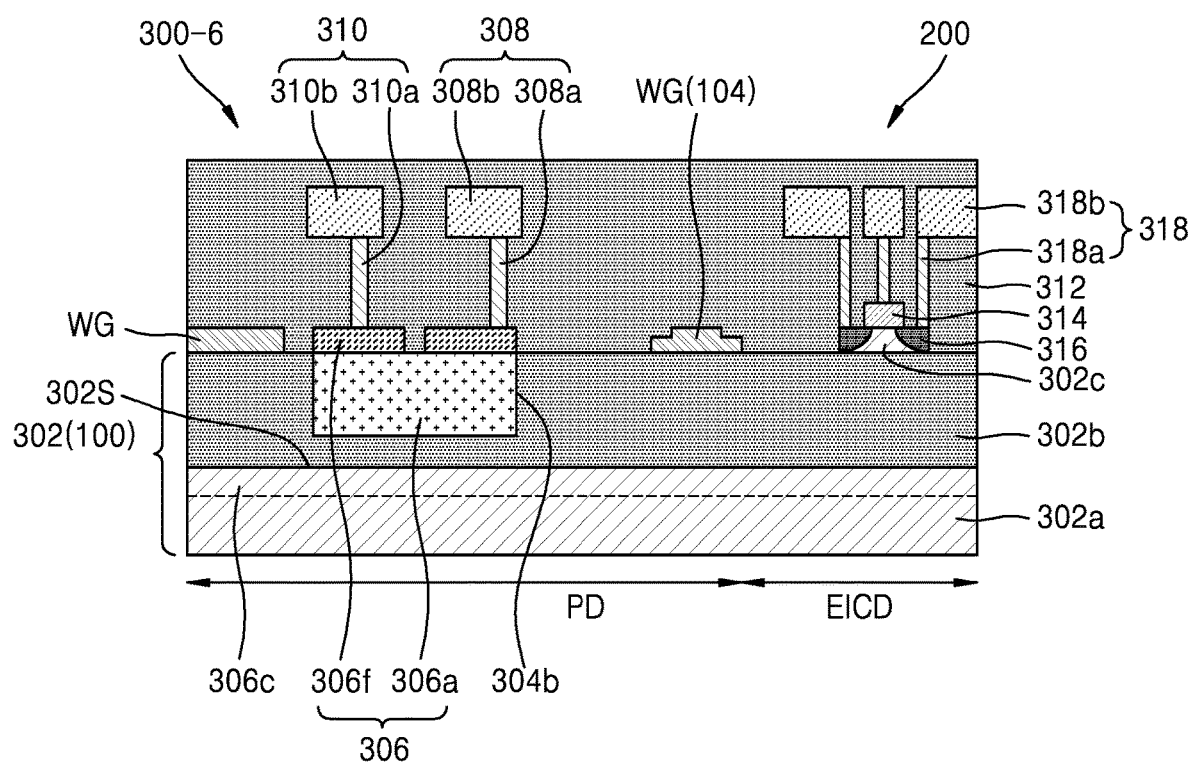
FIG. 8 is a cross-sectional view of a photoelectronic element according to an embodiment.

FIG. 8 is a cross-sectional view of a photoelectronic element 300-6 combined with an EICD according to an embodiment.

Specifically, the photoelectronic element 300-6 may be the same as the photoelectronic elements 300-7 of FIG. 7 except that the optical IC substrate 302 is an SOI substrate. The photoelectronic element 300-6 may be a PD and be combined with an EICD. In FIG. 8, the same reference numerals are used to denote the same elements as in FIG. 7 and the same descriptions as in FIG. 7 will be omitted or briefly provided.

The optical IC substrate 302 may be an SOI substrate including a base silicon layer 302a, a buried insulating layer 302b formed on the base silicon layer 302a, and a silicon layer 302c formed on the buried insulating layer 302b. The silicon layer 302c may be patterned and serve as an optical waveguide core layer WG to form one or more cores of one or more optical waveguides. The silicon layer 302c may be patterned and serve as an active layer of the EICD.

A local trench 304b may be formed in the buried insulating layer 302b of the optical IC substrate 302. A bottom of the local trench 304b may be formed apart from a surface 302S of the base silicon layer 302a, such as being formed by a surface of the buried insulating layer 302b or formed by an additional insulating layer deposited within an initial larger trench formed within buried insulating layer 302b. A photoelectric conversion layer 306 may be spaced apart from the surface 302S of the base silicon layer 302a and buried inside the local trench 304b. The photoelectric conversion layer 306 may be spaced apart from the surface 302S of the base silicon layer 302a and buried in the buried insulating layer 302b. The photoelectronic element 300-6 may be a metal-semiconductor-metal PD. An optical signal applied to the optical waveguide layer WG may be converted into an electric signal by the photoelectronic element 300-6 including the photoelectric conversion layer 306.

Figure 9:
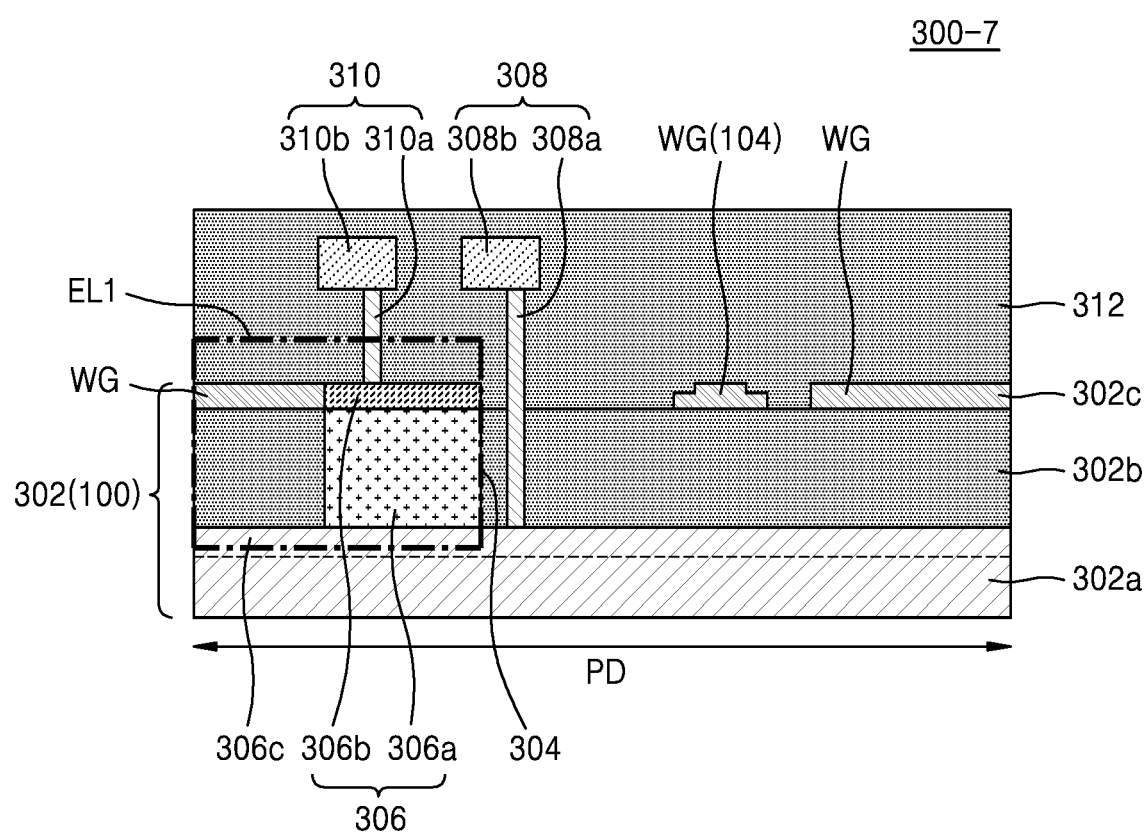
FIG. 9 is a cross-sectional view of a photoelectronic element according to an embodiment.

FIG. 9 is a cross-sectional view of a photoelectronic element 300-7 according to an embodiment.

The photoelectronic element 300-7 may be the same as the photoelectronic element 300-1 of FIG. 2 and shows details of an optical waveguide layer WG optically coupled to a side surface of a photoelectric conversion layer 306. The photoelectronic element 300-7 may be a PD. In FIG. 9, the same reference numerals are used to denote the same elements as in FIG. 2 and the same descriptions will be omitted or briefly provided.

The photoelectric conversion layer 306 may be buried inside a local trench 304 formed in optical IC substrate 302. The photoelectric conversion layer 306 may include a first semiconductor layer 306a and a second semiconductor layer 306b formed on the first semiconductor layer 306a. The photoelectric conversion layer 306 may include one or more crystalline silicon layers and crystalline germanium layers.

A silicon layer 302c of the optical IC substrate 302 may be patterned and used as the optical waveguide layer WG. The optical waveguide layer WG may correspond to the optical waveguide layer 104 of FIG. 1 and portions thereof may form one or more cores of optical waveguides of the photoelectronic element 300-7. As indicated by region EL1 of FIG. 9, one side surface of the optical waveguide layer WG may be optically coupled to (and contact) a one side surface of the photoelectric conversion layer 306 (here, one side surface of the second semiconductor layer 306b). The side surface of the optical waveguide layer WG (104) facing and contacting the side surface of the photoelectric conversion layer 306 may form a terminal end of an optical waveguide having optical waveguide layer WG (104) as a core. The optical waveguide layer WG or 104 may be optically coupled to a PIN PD including the photoelectric conversion layer 306 so that an optical signal applied to the optical waveguide layer WG 104 may be transmitted to impinge on the photoelectric conversion layer 306 and easily converted into an electric signal.

FIGS. 10 to 13 are cross-sectional views of optical couplings between the optical waveguide layer WG and the photoelectric conversion layer 306. The optical couplings of FIGS. 10 to 13 show regions corresponding to EL1 of FIG. 9 and include a waveguide having a waveguide core formed from optical waveguide layer WG (104) terminating adjacent to and optically coupled to the photoelectric conversion layer 306. The alternative structures of FIGS. 10 to 13 may be used not only with the device of FIG. 9, but with any of the embodiments described herein. It should also be appreciated that the coupling examples of FIGS. 9 to 13 may include additional optical elements disposed between the terminal end of the waveguide and the photoelectric conversion layer 306 to optically couple an optical waveguide (having a waveguide core formed by waveguide layer WG (104)) to the photoelectric conversion layer 306 (e.g., the additional optical element may be part of another optically transmissive element, such as an insulating layer, such as 312 or 302c).

Specifically, as indicated by EL1a, EL1b, EL1c, and EL1d of FIGS. 10 to 13, the optical waveguide layer WG of FIG. 9 may be easily optically coupled to the photoelectric conversion layer 306. In FIGS. 10 to 13, the same reference numerals are used to denote the same elements.

Figure 10:
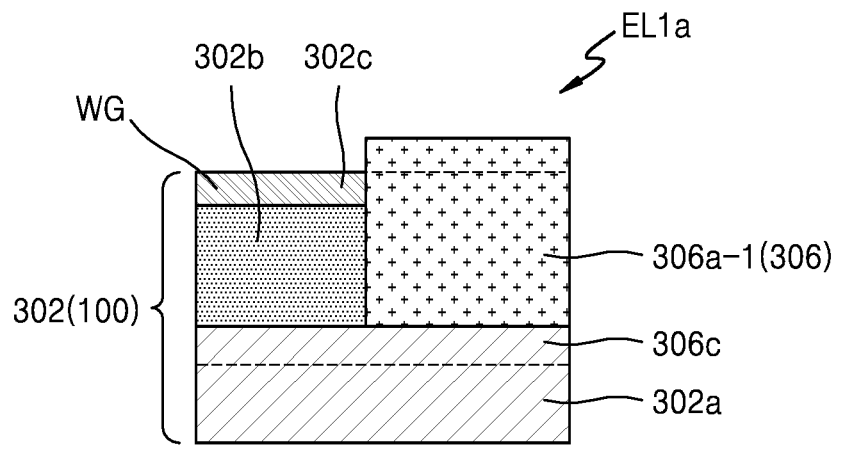
FIGS. 10 to 13 are cross-sectional views of an optical coupling relationship between an optical waveguide layer and a photoelectric conversion layer which may be implemented in the IC device embodiments described herein.

As shown in FIG. 10, one side surface of an optical waveguide layer WG may contact and be optically coupled to one side surface of a photoelectric conversion layer 306 including the first semiconductor layer 306a-1. A top surface of the optical waveguide layer WG may be located at a lower level than a top surface of the photoelectric conversion layer 306. The top surface of the photoelectric conversion layer 306 may be formed at a higher level than the top surface of the optical waveguide layer WG in a vertical direction on a base silicon layer 302a of an optical IC substrate. The first semiconductor layer 306a-1 may be a crystalline silicon layer or a crystalline germanium layer. The first semiconductor layer 306a-1 may be the uppermost layer of the photoelectric conversion layer 306 and form the top surface of the photoelectric conversion layer 306 or another layer, such as the second semiconductor layer 306b (not shown) may be formed on the top surface of the first semiconductor layer 306a-1 and form the top surface of the photoelectric conversion layer 306. In an embodiment, the first semiconductor layer 306a-1 may be a crystalline germanium layer and the second semiconductor layer 306b (not shown in FIG. 10) on the first semiconductor layer 306a-1 may be a crystalline silicon layer.

Figure 11:
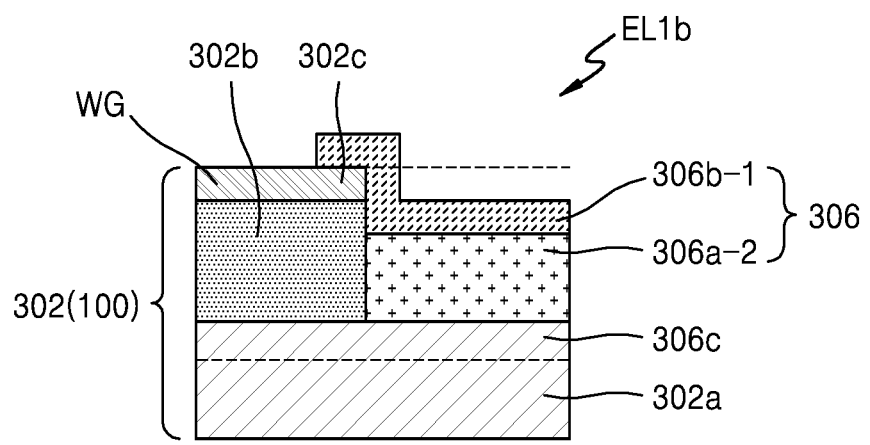

As shown in FIG. 11, a side surface of an optical waveguide layer WG may contact and be optically coupled to one side surface of a photoelectric conversion layer 306 including semiconductor layers 306a-2 and 306b-1. A top surface of the optical waveguide layer WG may be located at a higher level than a top surface of the photoelectric conversion layer 306 and may be located higher than the entire top surface of first semiconductor layer 306a-2. The majority of the top surface of the photoelectric conversion layer 306 (and a majority of the top surface of second semiconductor layer 306b-1 overlying first semiconductor layer 306a-2) may be located at a lower level than the top surface of the optical waveguide layer WG in a vertical direction on a base silicon layer 302a of an optical IC substrate The photoelectric conversion layer 306 may include a first semiconductor layer 306a-2 and a second semiconductor layer 306b-1, which is formed on the first semiconductor layer 306a-2 and the optical waveguide layer WG. The second semiconductor layer 306b-1 may be formed on part of an upper surface of the optical waveguide layer WG. The photoelectric conversion layer 306 may be formed to extend on top of the optical waveguide layer WG.

The photoelectric conversion layer 306 may include one or more crystalline silicon layers and crystalline germanium layers. In an embodiment, the first semiconductor layer 306a-2 may be a crystalline germanium layer, and the second semiconductor layer 306b-1 may include a crystalline silicon layer.

Figure 12:
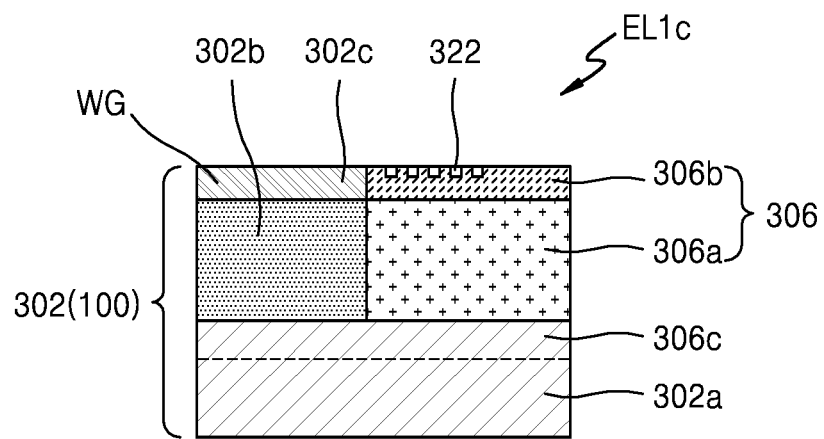

As shown in FIG. 12, one side surface of an optical waveguide layer WG may contact and be optically coupled to one side surface of a photoelectric conversion layer 306 including semiconductor layers 306a and 306b. A top surface of the optical waveguide layer WG may be located at the same level as a top surface of the photoelectric conversion layer 306.

The photoelectric conversion layer 306 may include a first semiconductor layer 306a and a second semiconductor layer 306b located on the first semiconductor layer 306a. The photoelectric conversion layer 306 may include one or more crystalline silicon layers and crystalline germanium layers. In an embodiment, the first semiconductor layer 306a may be a crystalline germanium layer, and the second semiconductor layer 306b may be a crystalline silicon layer.

An optical coupler 322 may be formed in one surface of the second semiconductor layer 306b. The optical waveguide layer WG may be optically coupled by the optical coupler 322 to a depletion region within the photoelectric conversion layer 306 (e.g., which may be formed within first semiconductor layer 306a) so that an optical signal applied to the optical waveguide layer WG may be easily converted into an electric signal. The optical coupler 322 may be a grating formed as a series of evenly spaced trenches etched into a top surface of second semiconductor layer 306b. Optical coupler 322 may act to reflect light transmitted in a horizontal direction by optical waveguide layer WG (302c) (acting as a core of an optical waveguide) in a downward direction into first semiconductor layer 306a. Although the optical coupler 322 (grating) is shown as being formed in a top surface of the photoelectric conversion layer 306, the optical coupler 322 (grating) may be formed elsewhere, such as within a top surface of the optical waveguide formed to extend over the photoelectric conversion layer 306 (which may be a portion of the waveguide that is not formed from silicon layer 302c).

Figure 13:
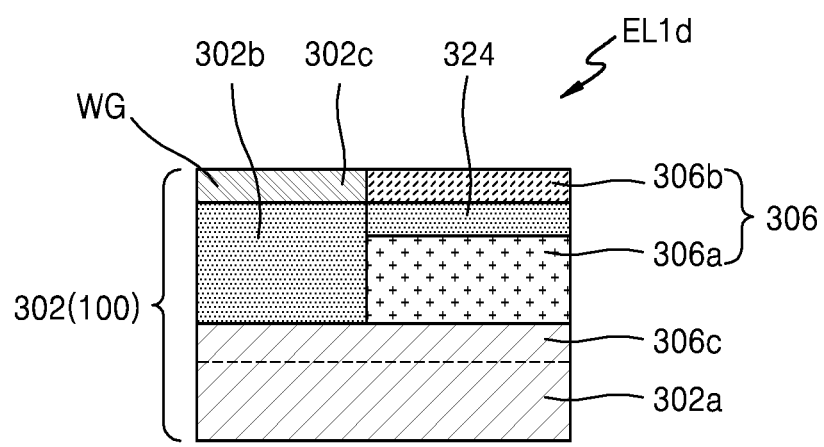

As shown in FIG. 13, an optical waveguide may be optically coupled to an evanescently coupled photoelectric conversion layer 306 (e.g., forming an evanescently coupled photodiode). In the example of FIG. 13, an optical waveguide is formed having a waveguide core formed by silicon layer 302c. A side surface of optical waveguide layer WG formed by silicon layer 302c may contact the second semiconductor layer 306b. Lower cladding of the waveguide may be formed by buried insulating layer 302b. Upper cladding of the optical waveguide may be the same as described elsewhere (e.g., air, interlayer dielectric 312, etc.) The optical waveguide may be optically coupled to the photoelectric conversion layer 306 including the first semiconductor layer 306a and second semiconductor layer 306b. A top surface of the optical waveguide layer WG may be the same level as a top surface of the photoelectric conversion layer 306 (e.g., coplanar with) the top surface of photoelectric conversion layer 306 formed by top surface of second semiconductor layer 306b. A bottom surface of the optical waveguide layer WG may be the same level (e.g., coplanar with) as a bottom surface of the second semiconductor layer 306b.

The photoelectric conversion layer 306 may include the first semiconductor layer 306a and the second semiconductor layer 306b. An insulating layer 324 may be formed between the first semiconductor layer 306a and the second semiconductor layer 306b. The insulating layer 324 may be a silicon oxide layer. Although the second semiconductor layer 306b does not contact the first semiconductor layer 306a (being separated by insulating layer 324), photoelectric conversion may occur in the photoelectric conversion layer 306 due to insulating layer 324 being made thin to provide evanescent coupling between the first semiconductor layer 306a and the second semiconductor layer 306b.

Figure 14:
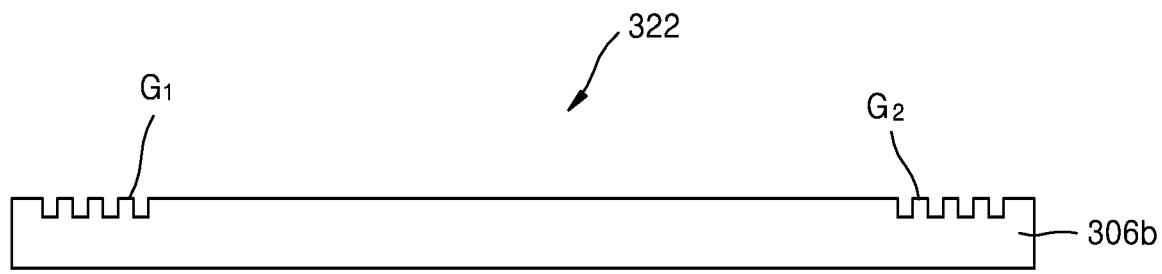
FIG. 14 is a cross-sectional view of an optical coupler of FIG. 12, according to an embodiment.

FIG. 14 is a cross-sectional view of an optical coupler 322 of FIG. 12, according to an embodiment.

Specifically, the optical coupler 322 may include a grating coupler. The optical coupler 322 may be implemented by forming gratings (e.g., G1 and G2) in a surface of a semiconductor layer 306b (or 302c). The optical coupler 322 may receive and transmit light by using the diffraction of light that meets the gratings G1 and G2. Also, the optical coupler 322 may filter light by adjusting a distance between the gratings G1 and G2. Gratings G1 and G2 may act to transmit light downwardly into a depletion region formed in photoelectric conversion layer 306 (e.g., downwardly to first semiconductor layer 306a in which the depletion region is formed).

A size (i.e., a period) of the gratings formed in the optical coupler 322 may be determined by a width 'w' and wavenumber vector (k-vector) of incident light. Thus, by forming appropriate gratings in the optical coupler 322, incident light may have high optical coupling efficiency and be optically coupled to the optical coupler 322.

Figure 15:
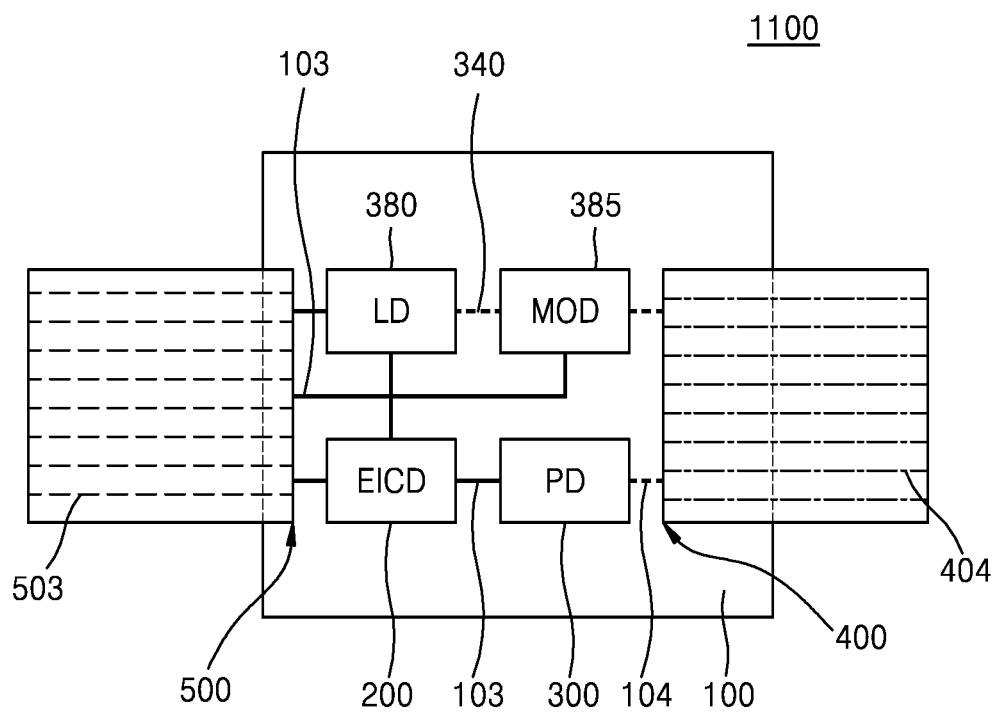
FIG. 15 is a plan view of an IC device according to an embodiment.

FIG. 15 is a plan view of an IC device 1100 according to an embodiment.

Specifically, the IC device 1100 may be the same as the IC device 1000 of FIG. 1 except that a photoelectronic element 300 and an electro-optic element 380, which serve as ODs, are further separated from each other on an optical IC substrate 100 and a light modulating device 385 is further integrated in the optical IC substrate 100. The light modulating device 385 may be a modulating (MOD) device. In FIG. 15, the same reference numerals are used to denote the same elements as in FIG. 1, and repeated descriptions thereof will be omitted or briefly provided.

An electric signal received through an interface interconnection line 503 of an electrical interface 500 may be transmitted through a circuit interconnection line 103 to an EICD 200, the electro-optic element 380, and the light modulating device 385. The electro-optic element 380 may generate an optical signal and transmit the optical signal to the light modulating device 385.

The light modulating device 385 may modulate the optical signal in response to the electric signal transmitted through the circuit interconnection line 103 and transmit the modulated optical signal through an optical waveguide layer 104 to an optical interface 400. The modulated optical signal may be transmitted to an external device through an optical fiber 404 of the optical interface 400. The EICD 200 may control the electro-optic element 380 using the circuit interconnection line 103 as needed.

An optical signal received through the optical fiber 404 included in the optical interface 400 may be applied to the photoelectronic element 300 through the optical waveguide layer 104. The photoelectronic element 300 may convert the optical signal into an electric signal and transmit the electric signal to the electrical interface 500 through the EICD 200 and the circuit interconnection line 103. The electric signal may be transmitted to an external device through the interface interconnection line 503 of the electrical interface 500.

Figure 16:
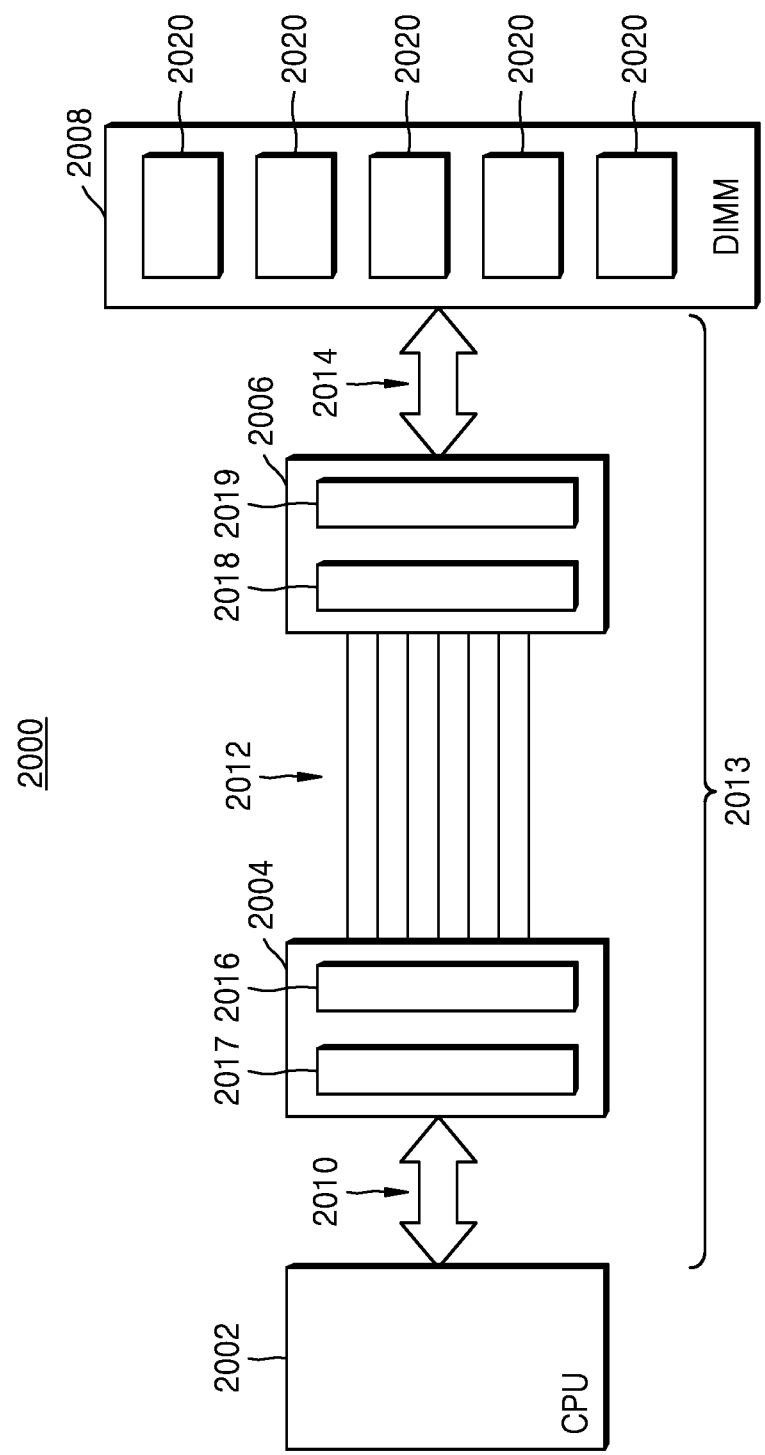
FIG. 16 is a diagram of an IC system including an IC device according to an embodiment.

FIG. 16 is a diagram of an IC system 2000 including IC devices 2004 and 2006 according to an embodiment.

Specifically, the IC system 2000 may include a central processing unit (CPU) 2002, which may communicate with at least one memory module 2008 via a connection system 2013. The memory module 2008 may be, for example, a dual-in-line memory module (DIMM). The DIMM may be a dynamic random access memory (DRAM) module. The memory module 2008 may include a plurality of individual memory circuits (e.g., DRAM memory circuits) 2020.

In the present embodiment, the CPU 2002 and the memory module 2008 may generate or process electric signals. The connection system 2013 may include an optical communication channel 2012 (e.g., an optical fiber) configured to transmit optical signals between the CPU 2002 and the memory module 2008.

Since the CPU 2002 and the memory module 2008 use electric signals, an electro-optic conversion process of converting the electric signals of the CPU 2002 and the memory module 2008 into optical signals is provided to transmit the optical signals on the optical communication channel 2012. Also, a photoelectric conversion process may be required to convert an optical signal on the optical communication channel 2012 into an electric signal to be processed by the CPU 2002 and the memory module 2008.

The connection system 2013 may include the IC devices 2004 and 2006, which are located on both sides of the optical communication channel 2012. Each of the IC devices 2004 and 2006 may be embodied by any of the IC devices described herein (e.g., 1000 of FIG. 1 or the IC device 1100 of FIG. 15), according to the embodiments. The optical communication channel 2012 may be one or more optical fibers connected to the optical interface 400 of the IC devices 2004 and 2006.

The CPU 2002 may transmit and receive electric signals to and from the IC device 2004 via an electrical bus 2010. The memory module 2008 may transmit and receive electric signals to and from the IC device 2006 via an electrical bus 2014. The IC devices 2004 and 2006 may transmit and receive optical signals to and from each other. The electrical buses 2010 and 2014 may be connected to the electrical interfaces 500 of the IC devices 2004 and 2006.

The IC device 2004 may include a photoelectronic element 2016 and an electro-optic element 2017. The IC device 2006 may include a photoelectronic element 2018 and an electro-optic element 2019. The electro-optic elements 2017 and 2019 may transmit optical signals to the optical communication channel 2012 (e.g., optical fiber(s)). The photoelectronic elements 2016 and 2018 may receive the optical signals from the optical communication channel 2012. The photoelectronic elements 2016 and 2018 may correspond to the photoelectronic element 300 of FIG. 1.

Figure 17:
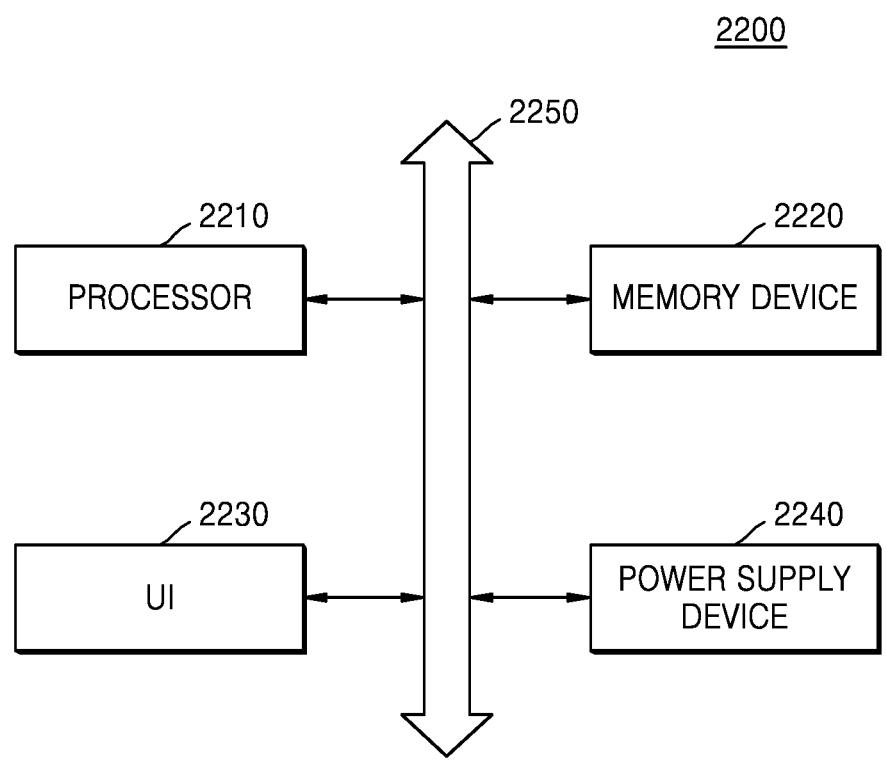
FIG. 17 is a block diagram of a computing system including an IC device according to an embodiment.

FIG. 17 is a block diagram of a computing system 2200 including an IC device according to an embodiment.

Specifically, the computing system 2200 may include a signal processing system, a display system, a communication system, or a system capable of optically transmitting a signal.

The computing system 2200 may include a processor 2210, which may communicate with another element through an optical bus 2250. The processor 2210 may include the IC device 1000 of FIG. 1 or the IC device 1100 of FIG. 15, according to the embodiments.

A semiconductor memory device 2220 may be coupled to the optical bus 2250. The semiconductor memory device 2220 may include the IC device 1000 of FIG. 1 or the IC device 1100 of FIG. 15, according to the embodiments. Thus, the semiconductor memory device 2220 may communicate with another element through the optical bus 2250. A power supply device 2240 may communicate with another element through the optical bus 2250. A user interface 2230 may receive inputs from a user and provide outputs to the user.

While the inventive concept has been particularly shown and described with reference to embodiments thereof, it will be understood that various changes in form and details may be made therein without departing from the spirit and scope of the following claims. For example, while substrates 302 of the IC device 1000 have been described as bulk silicon or SOI substrates, other semiconductor crystalline material may be used, such as bulk germanium and germanium on insulator substrates.

What is claimed is:

1. An integrated circuit (IC) device comprising:
   an optical IC substrate including a first silicon layer and a buried insulating layer, the buried insulating layer being on and having a bottom surface in contact with the uppermost surface of the first silicon layer;
   a local trench formed within the buried insulating layer; and
   a photoelectronic element including a photoelectric conversion layer formed within the local trench, the photoelectric conversion layer being spaced apart from the first silicon layer of the optical IC substrate by the buried insulating layer; and
   an optical waveguide core layer,
   wherein a top surface of the photoelectric conversion layer is at a lower level than a first top surface of the optical waveguide core layer in a vertical direction on the optical IC substrate, and the photoelectric conversion layer is formed to extend over a second top surface of the optical waveguide core layer.

2. The IC device of claim 1, further comprising:
   a first conductive line electrically connected to a first portion of the photoelectric conversion layer; and
   a second conductive line electrically connected to a second portion of the photoelectric conversion layer,
   wherein the photoelectronic element is a lateral photoelectronic element.

3. The IC device of claim 1,
   wherein the optical IC substrate comprises a silicon-on-insulator (SOI) substrate, the SOI substrate including the first silicon layer, the buried insulating layer on and in contact with the first silicon layer, and a second silicon layer on and in contact with the buried insulating layer, and
   wherein the photoelectronic element is spaced apart from an upper surface of the first silicon layer by a portion of the buried insulating layer.

4. The IC device of claim 3, further comprising an optical waveguide optically coupled to the photoelectric conversion layer of the photoelectronic element,
   wherein the local trench is formed in the buried insulating layer of the SOI substrate,
   wherein the photoelectric conversion layer is formed in contact with the buried insulating layer of the SOI substrate and electrically insulated by the buried insulating layer, and wherein the optical waveguide comprises a core formed from the second silicon layer of the SOI substrate.

5. The IC device of claim 1, further comprising an electronic IC device integrated with the optical IC substrate, wherein the buried insulating layer extends continuously between a location under the photoelectronic element and a location under the electronic IC device.

6. An integrated circuit (IC) device comprising:
an optical IC substrate;
a local trench formed in the optical IC substrate;
a photoelectronic element including a photoelectric conversion layer formed in the local trench; and
an optical waveguide core layer optically coupled to the photoelectric conversion layer,
wherein a bottommost surface of the optical waveguide core layer is higher than a bottommost surface of the photoelectric conversion layer,
wherein the optical IC substrate comprises a base silicon layer, a buried insulating layer on the base silicon layer, and an upper silicon layer on the buried insulating layer,
wherein the bottommost surface of the photoelectric conversion layer is spaced apart from an upper surface of the base silicon layer,
wherein the local trench is formed in the buried insulating layer of the optical IC substrate and has sidewalls comprising the buried insulating layer of the optical IC substrate, and
wherein the photoelectric conversion layer comprises a plurality of semiconductor layers including a first semiconductor layer on the buried insulating layer and a second semiconductor layer on the first semiconductor layer, and the uppermost surface of the first semiconductor layer in the local trench is formed at the same level as the uppermost surface of the buried insulating layer.

7. The IC device of claim 6, further comprising:
a first conductive line electrically connected to a first portion of the photoelectric conversion layer; and
a second conductive line electrically connected to a second portion of the photoelectric conversion layer,
wherein the photoelectronic element is a lateral photoelectronic element.

8. The IC device of claim 6, further comprising an optical waveguide including at least a portion of the optical waveguide core layer, the optical waveguide being optically coupled to the photoelectric conversion layer of the photoelectronic element,
wherein the photoelectric conversion layer comprises a plurality of semiconductor layers formed in the local trench at respective locations that are lower than the bottommost surface of the optical waveguide core layer.

9. The IC device of claim 6, further comprising an optical waveguide including at least a portion of the optical waveguide core layer, the optical waveguide being optically coupled to the photoelectronic element including the photoelectric conversion layer,
wherein the upper silicon layer on the buried insulating layer is the optical waveguide core layer and the optical waveguide comprises a core formed from the upper silicon layer.

10. The IC device of claim 6, further comprising an electronic IC device integrated with the optical IC substrate.

11. The IC device of claim 6, wherein the uppermost layer of the optical IC substrate comprises the optical waveguide core layer.

12. The IC device of claim 6, wherein the uppermost surface of the second semiconductor layer in the local trench is formed at the same level as the uppermost surface of the optical waveguide core layer.

13. The IC device of claim 6,
wherein the photoelectronic element is a photodiode comprising a cathode, an anode and a stack of functional layers extending between the cathode and the anode,
wherein the photoelectric conversion layer comprises the stack of functional layers, and
wherein the stack of functional layers are formed in the local trench in the optical IC substrate at a location below the bottommost surface of the optical waveguide core layer.

14. An integrated circuit (IC) device comprising:
an optical IC substrate;
a local trench formed within the optical IC substrate;
a photoelectronic element including a photoelectric conversion layer formed in the local trench; and
an optical waveguide core layer optically coupled to the photoelectric conversion layer,
wherein a bottommost surface of the optical waveguide core layer is higher than a bottommost surface of the photoelectric conversion layer,
wherein the optical IC substrate comprises a base silicon layer, a buried insulating layer on the base silicon layer, and an upper silicon layer on the buried insulating layer,
wherein the bottommost surface of the photoelectric conversion layer is spaced apart from an upper surface of the base silicon layer,
wherein the local trench is formed in the buried insulating layer of the optical IC substrate and has sidewalls comprising the buried insulating layer of the optical IC substrate,
wherein the bottommost surface of the photoelectric conversion layer contacts the buried insulating layer of the optical IC substrate in the local trench, and
wherein the photoelectric conversion layer is formed to extend over only a portion of a top surface of the optical waveguide core layer.

15. The IC device of claim 14,
wherein a top surface of the photoelectric conversion layer is at a lower level than a first top surface of the optical waveguide core layer in a vertical direction on the optical IC substrate, and
wherein the photoelectric conversion layer is formed to extend over a second top surface of the optical waveguide core layer.

16. The IC device of claim 14, wherein the uppermost layer of the optical IC substrate comprises the optical waveguide core layer.

17. The IC device of claim 14,
wherein the photoelectronic element is a photodiode comprising a cathode, an anode and a stack of functional layers extending between the cathode and the anode,
wherein the photoelectric conversion layer comprises the stack of functional layers, and
wherein the stack of functional layers are formed in the local trench in the optical IC substrate at a location below the bottommost surface of the optical waveguide core layer.

18. The IC device of claim 14, further comprising:
a first conductive line electrically connected to a first portion of the photoelectric conversion layer; and a second conductive line electrically connected to a second portion of the photoelectric conversion layer,
wherein the photoelectronic element is a lateral photoelectronic element.

19. The IC device of claim 1, wherein the top surface of the photoelectronic element is coplanar with the top surface of the buried insulating layer.

* * * * *